United States Patent [19]

Agapiou et al.

[11] Patent Number: 4,701,506
[45] Date of Patent: Oct. 20, 1987

[54] POLYMERIZATION CATALYST, PRODUCTION AND USE

[75] Inventors: Agapios K. Agapiou, Humble; Michael E. Muhle, Kingwood; Myron B. Kurtzman, Houston, all of Tex.

[73] Assignee: Exxon Chemical Patents Inc., Linden, N.J.

[21] Appl. No.: 892,154

[22] Filed: Jul. 30, 1986

Related U.S. Application Data

[62] Division of Ser. No. 759,202, Jul. 26, 1985, Pat. No. 4,618,596.

[51] Int. Cl.$^4$ .......................... C08F 4/62; C08F 4/64; C08F 4/68
[52] U.S. Cl. .................. 526/128; 526/129; 526/137; 526/348.6
[58] Field of Search .................. 526/128, 129, 137

[56] References Cited

U.S. PATENT DOCUMENTS

| | | | |
|---|---|---|---|
| 4,263,168 | 4/1981 | Rochefory et al. | 526/129 X |
| 4,301,029 | 11/1981 | Caunt et al. | 526/128 X |
| 4,388,220 | 6/1983 | Hartshorn et al. | 502/125 X |
| 4,451,574 | 5/1984 | Johnson | 526/137 X |
| 4,508,843 | 4/1985 | Etherton et al. | 526/129 X |

*Primary Examiner*—Patrick P. Garvin
*Attorney, Agent, or Firm*—J. F. Hunt

[57] ABSTRACT

Ethylene and alpha-olefins are homopolymerized or copolymerized with another olefin monomer in the presence of a catalyst system comprising an organo metal cocatalyst and a titanium-containing catalyst component, said titanium-containing catalyst component being obtained by reacting in the presence of a porous particulate material, a halogen, an organic magnesium compound, an oxygen-containing compound, titanium tetrachloride and treating the solids with an organometallic compound of a Group IIa, IIb or IIIa metal.

21 Claims, No Drawings

POLYMERIZATION CATALYST, PRODUCTION AND USE

This is a division, of application Ser. No. 759,202, filed July 26, 1985 and now U.S. Pat. No. 4,618,596.

BACKGROUND OF THE INVENTION

This invention relates to a novel catalyst component to be employed with a cocatalyst for use in the polymerization of olefins to polyolefins such as polyethylene, polypropylene and the like, or copolymers such as ethylene copolymers with other alpha-olefins and diolefins, which catalyst component imparts unusually high activity and improved comonomer response and the polymer product obtained has a desirable bulk density. The catalyst component is especially useful for the production of linear polyethylenes such as high density and linear low density polyethylene. The polymer product obtained evidences an important balance of polymer properties, for example, the catalyst system obtains a polymer with a narrow molecular weight distribution and an improved balance in polymer product machine direction tear strength and transverse direction tear strength. As a result, the film blown from resin produced from the catalyst manifests an overall high strength.

The catalyst system can be employed in slurry, single-phase melt, solution or gas-phase polymerization processes and is particularly effective for the production of linear polyethylenes such as high density polyethylene and linear low density polyethylene.

Recently, interest has arisen in the use of magnesium-titanium complex catalyst components for the polymerization of olefins. For example, European Patent Application No. 27733, published Apr. 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter deactivated with a deactivating agent such as hydrogen chloride. This patent does not teach the use of support material such as silica, but otherwise the disclosure is similar to the above-discussed European patent application.

U.S. Pat. No. 4,250,288 discloses a catalyst which is the reaction product of a transition metal compound, an organomagnesium component, and an active non-metallic halide such as HCl and organic containing a labile halogen. The catalyst reaction product also contains some alkylaluminums.

Catalyst components comprising the reaction product of an alkylaluminum-magnesium alkyl complex plus titanium halide are disclosed in U.S. Pat. No. 4,004,071 and U.S. Pat. No. 4,276,191.

U.S. Pat. No. 4,173,547 and U.S. Pat. No. 4,263,171 respectively disclose a catalyst component comprising silica, an aluminum-type titanium trichloride and dibutyl magnesium and a catalyst component comprising a alkylmagnesium-alkylaluminum complex plus titanium halide on a silica support.

The use of chlorine gas in polymerization processes is taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a cocatalyst for the polymerization of ethylene.

European patent application No. 32,308 discloses polymerizing ethylene in the presence of a catalyst system comprising an organic metal compound and a titanium-containing material which is obtained by reacting together an inert particulate material, an organic magnesium compound, a titanium compound and a halogen containing compound such as $SiCl_4$, $PCl_3$, $BCl_3$, $Cl_2$ and the like.

Each of U.S. Pat. No. 4,402,861, 4,378,304, 4,388,220, 4,301,029 and 4,385,161 disclose supported catalyst systems comprising an oxide support such as silica, an organomagnesium compound, a transition metal compound and one or more catalyst component modifiers. These patents do not disclose the catalyst of this invention.

The catalyst systems comprising magnesium alkyls and titanium compounds, although generally useful for the polymerization of olefins such as ethylene and other 1-olefins, do not show excellent responsiveness to hydrogen during the polymerization reaction for the control of molecular weight, do not readily incorporate comonomers such as butene-1 for the production of ethylene copolymers, do not show an extremely high catalytic activity and obtain polymer product whose film properties are unbalanced under anisotropic conditions.

In U.S. Pat. No. 4,451,574 issued May 29, 1984, a catalyst system obtained by treating an inert particulate support, such as silica, with an organometallic compound, a titanium halide and a halogen gas is disclosed. Although the catalyst obtains very high activities, there is a need for improving the film properties of polymer product obtained by polymerizing olefins in the presence of the catalyst and to improve the bulk density of polymer product.

In copending application Ser. No. 637,641 filed Aug. 3, 1984 and now U.S. Pat. No. 4,565,797, there is disclosed a transition metal supported catalyst component obtained by contacting an inert solid support sequentially with (a) the reaction product of a dialkyl magnesium compound and an oxygen-containing compound, (b) optionally a halogen, interhalogen or halosilane, (c) a transition metal halide such as $TiCl_4$, (d) optionally $Cl_2$, $Br_2$ or an interhalogen and treating the resultant solid with an organometallic compound of a Group IIa, IIb or IIIa metal with the proviso that if a chlorosilane is not employed in step (b) then $Cl_2$, $Br_2$ or an interhalogen is employed in at least one of steps (b) or (d).

In accordance with this invention catalyst combinations have been found which have very high catalytic activities and excellent hydrogen responsiveness for the control of molecular weight, excellent comonomer response, obtain polymer product with greatly improved film properties. The resins exhibit excellent melt strength along with a decrease in extrusion power consumption, resulting in increased bubble stability in blown film production. In addition, the resins exhibit an increase in extrusion rates. The invention is distinguished over the copending application in that the polymers produced the presence of the catalyst of this invention have unexpected improved bulk density.

The new catalyst components of this invention are obtained by contacting in the presence of an oxide support, a halogen or interhalogen compound, an organometallic compound, an oxygen-containing compound such as a ketone, aldehyde, siloxane or alcohol, a transition metal compound, and treating the obtained solid with an organometallic compound of a Group IIa, IIb or IIIa metal such as, for example, an alkylaluminum. The catalyst system comprising the transition metal-containing catalyst component and an organoaluminum cocatalyst is advantageously employed in a gas phase ethylene polymerization process since there is a decrease in reactor fouling as generally compared with catalytic prior art ethylene gas phase polymerization processes thereby resulting in less frequent reactor shut downs for cleaning purposes.

SUMMARY OF THE INVENTION

In accordance with the objectives of this invention there is provided a transition metal-containing catalyst component for the polymerization of alpha-olefins comprising a solid reaction product obtained by treating an inert solid support material in an inert solvent with (A) $Cl_2$, $Br_2$ or an interhalogen, (B) an organometallic compound of a Group IIa, IIb or IIIa metal of the Periodic Table wherein all the metal valencies are satisfied with a hydrocarbon or substituted hydrocarbon group, (C) an oxygen-containing compound selected from ketones, aldehydes, alcohols, siloxanes or mixtures thereof, (D) at least one transition metal compound of a Group IVb, Vb, VIb or VIII metal of the Periodic Table, and (E) treating the transition metal-containing component with an organometallic compound of a Group IIa, IIb, or IIIa metal, with the proviso that the (B) and (C) ingredients can be employed (i) simultaneously, (ii) as the reaction product of (B) and (C), or (iii) treatment with (C) immediately precedes treatment with (B).

The solid transition metal-containing catalyst component when employed in combination with a cocatalyst such as an alkylaluminum cocatalyst provides a catalyst system which demonstrates a number of unique properties that are of great importance in olefin polymerization technology such as, for example, extremely high catalytic activity, the ability to control the molecular weight during the polymerization reaction as a result of the improved responsiveness to hydrogen, improved comonomer response, increased polymer yield, and reduced reactor fouling. A particular advantage of the instant invention is the ability of catalytically producing polymer product having high bulk density.

In a preferred embodiment of the invention the (B) organometallic compound is a dihydrocarbyl magnesium compound represented by $R^1MgR^2$ wherein $R^1$ and $R^2$ which can be the same or different are selected from alkyl groups, aryl groups, cycloalkyl groups, aralkyl groups, alkadienyl groups or alkenyl groups having from 1 to 20 carbon atoms, the (C) oxygen-containing compounds are selected from alcohols and ketones represented by the formula $R^3OH$ and $R^4COR^5$ wherein $R^3$ and each of $R^4$ and $R^5$ which may be the same or different can be an alkyl group, aryl group, cycloalkyl group, aralkyl group, alkadienyl group or alkenyl group having from 1 to 20 carbon atoms, the (D) transition metal compound is preferably a transition metal compound or combination of transition metal compounds represented by the formulas $TrX''_{4-q}(OR^8)_q$, $TrX''_{4-q}R^9_q$, $VO(OR^8)_3$ and $VOX''_3$ wherein Tr is a transition metal of Groups IVb, Vb, VIb, and VIII and preferably titanium, vanadium or zirconium, $R^8$ is an alkyl group, aryl group, aralkyl group, or substituted aralkyl group having from 1 to 20 carbon atoms and 1,3-cyclopentadienyls, $X''$ is halogen and q is zero or a number less than or equal to 4, and $R^9$ is an alkyl group, aryl group or aralkyl group having from 1-20 carbon atoms or a 1,3-cyclopentadienyl, and the (E) organometallic compound is an alkylaluminum represented $R^7_nAlX'_{3-n}$ wherein $X'$ is a halogen, or hydride and $R^7$ is a hydrocarbon group selected from alkyl group, aryl group, cycloalkyl group, aralkyl group, alkadienyl group or alkenyl group having from 1 to 20 carbon atoms and $1 \leq n \leq 3$.

All references to the Periodic Table are to the Periodic Table of the Elements printed on page B-3 of the 56th Edition of Handbook of Chemistry and Physics, CRC Press (1975).

Although, in accordance with this invention, the order of addition of ingredients to the silica in forming the transition metal-containing catalyst component can vary (with the exception of step (A) which must be first), the transition metal-containing catalyst component is preferably prepared by first treating the inert solid support with (A) $Cl_2$, $Br_2$ or an interhalogen or mixtures thereof followed by treatment with the reaction product of (B) the organometallic compound with (C) the oxygen-containing compound and thereafter treating the solid with the (D) the transition metal compound and finally (E) an alkylaluminum.

In a second embodiment of this invention there is provided a catalyst system comprising the transition metal-containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional Ziegler catalysts, it is generally not necessary to deash polymer product since polymer product will generally contain lower amounts of catalyst residues than polymer product produced in the presence of conventional catalysts.

The catalyst system can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, 4-methylpentene-1, pentene, hexene. butadiene, 1,4-pentadiene and the like, so as to form copolymers of low and medium densities. The supported catalyst system is particularly useful for the polymerization of ethylene and copolymerization of ethylene with other alphaolefins in gas phase processes.

DESCRIPTION OF THE PREFERRED EMBODIMENTS

Briefly, the catalyst component of the present invention comprises the solid reaction product obtained by contacting a solid support material with (A) a halogen or interhalogen compound, (B) an organometallic composition, (C) an oxygen-containing compound, (D) at least one transition metal compound and, finally, treating with (E) an organometallic compound of a Group IIa, IIb, IIIa metal. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc and inorganic oxides. Preferably the support material is a metal oxide in finely divided form.

Suitable inorganic oxide materials which are desirably employed in accordance with this invention include Group IIa, IIIa, or IVa or IVb metal oxides such as silica, alumina, and silica-alumina and mixtures thereof. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, such as trimethylchlorisilane, dimethyldichlorosilane, silylamines, such as hexamethyldisilazane and dimethylaminotrimethylsilane and the like. The chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen free inert hydrocarbon solvent. The wash solvents, as well as the diluents employed to form the slurry. and the solution of chemical dehydrating agent, can be any suitable inert hydrocarbon. Illustrative of such hydrocarbons are heptane, hexane, toluene, isopentane and the like.

The preferred (B) organometallic compounds employed in this invention are the inert hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 carbon atoms. Illustrative but non-limiting examples of magnesium compounds which may be suitably employed in accordance with the invention are dialkylmagnesiums such as diethylmagnesium, dipropylmagnesium, di-isopropylmagnesium, di-n-butylmagnesium, di-isobutylmagnesium, diaamagnesium, di-n-octylmagnesium, di-n-hexylmagnesium, di-n-decylmagnesium, and di-n-dodecmagnesium; dicycloalkylmagnesiums, such as dicyclohexylmagnesium; diaryl magnesiums such as dibenmagnesium, ditolylmagnesium and dixylylmagnesium and the like.

Preferably the organomagnesium compounds will have from 1 to 6 carbon atoms and most preferably $R^1$ and $R^2$ are different. Illustrative examples of the preferred magnesium compounds are are ethyl-n-promagnesium, ethyl-n-butylmagnesium, amyl-n-hexylmagnesium, n-butyl-s-butylmagnesium, n-butyl-n-octylmagnesium, and the like. Mixtures of hydrocarbyl magnesium compounds may be suitably employed such as for example di-n-butylmagnesium and ethyl-n-butylmagnesium.

The magnesium hydrocarbyl compounds are generally obtained from commercial sources as mixtures of the magnesium hydrocarbon compounds with a minor amount of aluminum hydrocarbyl compound. The minor amount of aluminum hydrocarbyl is present in order to facilitate solublization and/or reduce the viscosity of the organomagnesium compound in hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylene, etc.

The organomagnesium complex with a minor amount of alkylaluminum can be represented by the formula $(R^1MgR^2)_p(R^6{}_3Al)_s$ wherein $R^1$ and $R^2$ are defined as above, $R^6$ is defined as $R^1$ and $R^2$ and p is greater than 0. The ratio of $s/s+p$ is from 0 to 1, preferably from 0 to about 0.7 and most desirably from about 0 to 0.1.

Illustrative examples of the organomagnesium-organoaluminum complexes are $[(n-C_4H_9)(C_2H_5)Mg][(C_2H_5)_3Al]_{0.02}$, $[(n-C_4H_9)_2Mg][(C_2H_5)_3Al]_{0.013}$, $[(n-C_4H_9)_2Mg][(C_2H_5)_3Al]_{2.0}$ and $[(n-C_6H_{13})_2Mg][(C_2H_5)_3Al]_{0.01}$. A suitable magnesium-aluminum complex is MAGALA ® BEM manufactured by Texas Alkyls, Inc.

The hydrocarbon soluble organometallic compositions are known materials and can be prepared by conventional methods. One such method involves, for example, the addition of an appropriate alkyl-aluminum to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The oxygen-containing compounds which may be usefully employed in accordance with this invention are alcohols, aldehydes, siloxanes and ketones. Preferably the oxygen-containing compounds are selected from alcohols and ketones represented by the formulas $R^3OH$ and $R^4COR^5$ wherein $R^3$ and each of $R^4$ and $R^5$, which may be the same or different, can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms. Most preferably the R groups are alkyl groups and will have from 2 to 6 carbon atoms.

Illustrative, but non-limiting examples of alcohols, which may be usefully employed in accordance with this invention are alkyl alcohols such as ethanol, 1-propanol, 2-propanol, 1-butanol, 2-butanol, t-butanol, 1-hexanol, 2-ethyl-1-hexanol, 1-decanol; cycloalkyl alcohols such as cyclobutanol, cyclohexanol; aryl alcohols, such as phenol, 1-naphthol, 2-naphthol; aralkyl alcohols such as benzyl alcohol, p-cresol. m-cresol; alkenyl alcohols such as allyl alcohol, crotylalcohol, 3-butene-1-ol; and alkadienyl alcohols such as 2,4-hexadiene-1-ol. The most preferred alcohol is 1-butanol.

The ketones will preferably have from 3 to 11 carbon atoms. Illustrative, but non-limiting, ketones are alkyl ketones such as acetone, 3-pentanone, 4-heptanone, methylethylketone, methylbutylketone; cycloalkyl ketones such as cyclohexanone, cyclopentanone, 2-methylcyclohexanone; aryl ketones such as benzophenone, acetophenone, propiophenone; alkenyl ketones such as methylvinylketone and methylallylketone. The most preferred ketone is acetone.

Illustrative, but non-limiting, aldehydes which can be usefully employed in the preparation of the organomagnesium compound include alkylaldehydes such as formaldehyde, acetaldehyde, propionaldehyde, butanal, pentanal, hexanal, heptanal, octanal, 2-methylpropanal, 3-methylbutanal; aryl aldehydes such as benzaldehyde; alkenyl aldehydes such as acrolein, crotonaldehyde; aralkyl aldehydes such as phenylacetaldehyde, o-tolualdehyde, m-tolualdehyde, p-tolualdehyde. The most preferred aldehydes are acetaldehyde and formaldehyde.

Illustrative of the siloxanes which may be usefully employed in the preparation of the organomagnesium compound include hexamethyldisiloxane, octamethyltrisiloxane, octamethylcyclotetrasiloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylydrosiloxanes, polymethylethylsiloxanes, polymethyloctylsiloxanes, and polyphenylhydrosiloxanes.

The transition metal compounds of a Group IVb, Vb, VIb or VIII metal which can be usefully employed in the preparation of the transition metal-containing catalyst component of this invention are well known in the art. The transition metals which can be employed in accordance with this invention may be represented by the formulas $TrX'_{4-q}(OR^8)_q$, $TrX'_{4-q}R^9_q$, $VOX'_3$ and $VO(OR^8)_3$. Tr is a Group IVb, Vb, VIb, and VIII metal, preferably Group IVb and Vb metals and preferably titanium, vanadium or zirconium, q is 0 or a number equal to or less than 4, $X'$ is halogen and $R^8$ is an alkyl group, aryl group or cycloalkyl group having from 1 to 20 carbon atoms and $R^9$ is an alkyl group, aryl group, aralkyl group, substituted aralkyl group, 1,3-cyclopentadienyls and the like. The aryl, aralkyls and substituted aralkyls contain from 1 to 20 carbon atoms preferably 1 to 10 carbon atoms. When the transition metal compound contains a hydrocarbyl group, $R^9$, being an alkyl, cycloalkyl, aryl, or aralkyl group, the hydrocarbyl group will preferably not contain a H atom in the position beta to the metal-carbon bond. Illustrative, but nonlimiting, examples of alkyl groups are methyl, neo-penyl, 2,2-dimethylbutyl, 2,2-dimethylhexyl; aryl groups such as phenyl, naphthyl; aralkyl groups such as benzyl; cycloalkyl groups such as 1-norbornyl. Mixtures of the transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$.

As indicated above, mixtures of the transition metal compounds may be usefully employed, no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The halogens (A) which can be suitably employed in accordance with this invention are $Cl_2$, $Br_2$, $I_2$ and mixtures thereof. Illustrative interhalogen compounds are $ClF$, $ClF_3$, $BrF$, $BrF_3$, $BrF_5$, $ICl$, $ICl_3$ and $IBr$. The preferred halogens are $Cl_2$ and $Br_2$. The preferred interhalogens contain Br or Cl.

The transition metal-containing catalyst solid is treated with an organometallic compound of a Group IIa, IIb or IIIa metal. Preferably the organometallic compound employed in the treatment step (E) is an alkylaluminum represented by the structural formula $R^7_nAlX_{3-n}$ is halogen or hydride and $R^7$ is a hydrocarbyl group selected from $C_1$ to $C_{18}$ saturated hydrocarbon radicals and $1 \leq n \leq 3$.

Illustrative of such compounds which can usefully be employed in the treatment step of this invention are $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$. Preferably the organoaluminum compound is a trialkylaluminum where the alkyl groups can have from 1 to 10 carbon atoms and most preferably from 2 to 8 carbon atoms. Tri-n-hexylaluminum and tri-n-octylaluminum being most preferred.

The treatment of the support material as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane and nonane; cycloalkanes such as cyclopentane and cyclohexane; and aromatics such as benzene, toluene, ethylbenzene and the xylenes. The amount of solvent to be employed is not critical. Nevertheless, the amount should be employed so as to provide adequate heat transfer away from the catalyst components during reaction and to permit good mixing.

The organometallic component (B) employed either as the organometallic compound or its reaction product with (C) an oxygen-containing compound is preferably added to the inert solvent in the form of a solution. Preferred solvents for the organometallic compositions are the alkanes such as hexane, heptane, octane and the like. However, the same solvent as employed for the slurrying inert particulate support material can be employed for dissolving the organometallic composition. The concentration of the organometallic composition in the solvent is not critical and is limited only by handling needs.

The amount of materials usefully employed in the solid catalyst component can vary over a wide range. The concentration of magnesium deposited on the essentially dry, inert support can be in the range from about 0.1 to about 2.5 millimoles/g of support, however, greater or lesser amounts can be usefully employed. Preferably, the magnesium compound concentration is in the range of 0.5 to 2.0 millimoles/g of support and especially 1.0 to 1.8 millimoles/g of support. The magnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen-containing compound and the mode of addition. When the oxygen-containing compound is not pre-mixed with the magnesium compound, that is, when it is added to the support before the magnesium compound or after the magnesium compound, the ratio may range from 0.01 to 2.0. When premixed with the organomagnesium compound, the hydrocarbyl groups on the oxygen-containing compound must be sufficiently large to ensure solubility of the reaction product, otherwise the ratio of oxygen-containing compound to organomagnesium compound ranges from 0.01 to 1.0, most preferably 0.8 to 1.0.

The transition metal compound is added to the inert support at a concentration of about 0.01 to about 1.5 mmoles Ti/g of dried support, preferably in the range of about 0.05 to about 1.0 mmoles Ti/g of dried support and especially in the range of about 0.1 to 0.8 mmoles Ti/g of dried support. The halogen or interhalogen treatment is such as to provide an excess of the halogen or interhalogen. Generally, the halogen employed, such as, for example, $Cl_2$, is employed in the form of a gas.

The halogen treatment of the catalyst can be accomplished, for example, by exposing the catalyst in either dry or slurry form to gaseous chlorine at 1.0 to 10 atmospheres total pressure for about 10 minutes to 4 hours at temperatures ranging from about 0° to 100° C. A mixture of $Cl_2$ and an inert gas such as argon or nitrogen can be used. The molar concentration of $Cl_2$ in the inert gas can range from about 1 mole % to 100 mole %.

The treatment of the solids with the Group IIa, IIb or IIIa metal alkyl can be accomplished, for example, by either adding the Group IIa, IIb or IIIa metal hydrocarbyl to the solid mixture or by slurrying the dried solid mixture in an inert solvent followed by the appropriate quantity of the organometallic treating agent.

The amount of treating agent (E) to be employed should be such as to provide a mole ratio of about 0.5 to about 50 and preferably 1 to about 20 with respect to titanium. Most preferably the mole ratio will be from about 3 to about 10.

Generally, the individual reaction steps can be conducted at temperatures in the range of about −50° C. to about 150° C. Preferred temperature ranges are from about −30° C. to about 60° C. with −10° C. to about 50 C being most preferred. The reaction time for the individual treatment steps can range from about 5 minutes to about 24 hours. Preferably the reaction time will be from about ½ hour to about 8 hours. During the reaction constant agitation is desirable.

In the preparation of the transition metal-containing catalyst component washing after the completion of any step may be effected. However, it is generally found that the material advantages of the catalyst system are diminished by washing until the completion of step (E).

The transition metal-containing catalyst component prepared in accordance with this invention are usefully employed with cocatalysts well known in the art of the Ziegler catalysis for polymerization of olefins. Typically, the cocatalysts which are used together with the transition metal-containing catalyst component are organometallic compounds of Group Ia, IIa, IIb, and IIIa metals such as alkyl aluminums, alkylaluminum hydrides, lithium alkylaluminums, zinc alkyls. magnesium alkyls and the like. The cocatalysts desirably used are the organoaluminum compounds. The preferred alkylaluminum compounds are represented by the formula $AlR'''_n X''_{3-n}$ wherein $1 \leq n \leq 3$ and $R'''$ is hydrogen, hydrocarbyl or substituted hydrocarbyl group and $X''$ is halogen. Preferably $R'''$ is an alkyl group having from 2 to 8 carbon atoms. Illustrative examples of the cocatalyst material are ethylaluminum dichloride, ethylaluminum sesquichloride, diethylaluminum chloride, triethylaluminum, tri-n-butylaluminum, diisobutylaluminum hydride, diethylaluminum ethoxide and the like. Trialkylaluminum compounds are most preferred with triisobutylaluminum being highly desirable.

The catalyst system comprising the alkylaluminum cocatalyst and the transition metal-containing catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst may be usefully employed to produce high density polyethylene or linear low density polyethylene by copolymerizing ethylene with other alpha-olefins or diolefins, particularly propylene, butene-1, pentene-1, hexene-1, and octene-1. The olefins can be polymerized in the presence of the catalyst of this invention by any suitable known process such as, for example, suspension, solution and gas-phase polymerization processes.

The polymerization reaction employing catalytic amounts of the above-described catalyst can be carried out under conditions well known in the art of Ziegler polymerization, for example, in an inert diluent at a temperature in the range of 50° C. to 120° C. and a pressure of 1 and 40 atmospheres or in the gas phase at a temperature range of 70° C. to 100° C. at about 1 to about 50 atmospheres and upward. Illustrative of the gas-phase processes are those disclosed in U.S. Pat. Nos. 4,302,565 and 4,302,566 which references are hereby incorporated by reference. As indicated above, one advantageous property of the catalyst system of this invention is the reduced amount of gas phase reactor fouling. The catalyst system can also be used to polymerize olefin at single phase conditions, i.e., 150° C. to 320° C. and 1000–3000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In the Examples and Comparative Examples, the silica support was prepared by placing Davison Chemical Company either G-948 or Crosfield SD-467 silica gel in a vertical column and fluidizing with an upward flow of $N_2$. The column was heated slowly to 800° C. and held at that temperature for 12 hours after which the silica was cooled to ambient temperature. The melt index (MI) was measured in accordance with ASTM Test D1238 (condition E). The resin density was determined by density gradient column according to ASTM Test D1505. The bulk density was determined by allowing approximately 120 cc of resin to fall from the bottom of a polyethylene funnel across a gap of 1 inch into a tared 100 cc plastic cylinder (2.6 cm in diameter by 19.0 cm high). The funnel bottom was covered with a piece of cardboard until the funnel was filled with the sample. The entire sample was then allowed to fall into the cylinder. Without agitating the sample, excess resin was scraped away so that the container was completely filled without excess. The weight of resin in the 100 cc cylinder was determined. This measurement was repeated 3 times and the average value reported.

EXAMPLE 1

699 g of silica (SD-467) was slurried in 5,000 ml of isopentane at 25° C. under a nitrogen blanket in a 8 l reactor. The slurry temperature was raised to 35° C. and the reaction vessel was pressured to about 11 psig with chlorine which was flowed into the reactor at a constant flow rate of 3.9 g/min for one hour and 45 minutes at a temperature maintained between 35° and 40° C. at which time no further chlorine uptake was observed. The chlorine atmosphere was thereafter removed by means of nitrogen flow. To the slurry was added 1,587 ml of a reaction mixture of n-buylethylmagnesium and butanol, prepared by pre-reacting 10 wt % BEM in hexane with neat butanol to produce an alcohol/magnesium molar ratio of 1 at a concentration of 0.62 mmole Mg/ml of solution. The reaction mixture which was added to the reactor over 30 minutes with stirring was thereafter stirred for a total of two hours at which time 40 g of neat $TiCl_4$ was added over 15 min. while maintaining the temperature at 35° C. The $TiCl_4$ reaction was continued for one hour with constant stirring while maintaining the temperature at 35° C. To the slurry was then added over 20 min. with stirring 445 ml of a 25 weight percent of a tri-n-hexylaluminum solution in isopentane. The slurry was then maintained with stirring one hour at 35° C. The solvent was removed by residue drying the slurry at 75° C. under flowing nitrogen. Analysis of the solids indicated that it contained 0.95% (w/w) Ti, 0.81% (w/w) Al, 2.40% (w/w) Mg, 9.00% (w/w) Cl.

Gas phase polymerization

A 36-inch fluid bed reactor, operated in a continuous manner, at 82° C. and a total pressure of 300 psig, was employed to produce an ethylene-butene-1 copolymer (LLDPE). A reaction mixture comprising 33 mole % ethylene, sufficient butene-1 and hydrogen to provide a $C_4H_8/C_2H_4$ molar ratio of 0.40 and a $H_2C_2H_4$ molar ratio of 0.09 was circulated continuously through the bed at a superficial velocity of 1.8 ft/sec. The supported titanium-containing solid prepared above was continuously pumped at a feed rate of 16.5 g/hr into the reactor and a 11 wt % triethylaluminum in isopentane solution was continuously pumped into the reactor at a feed rate of 340 cc/hr. The production rate was maintained at 237 lbs/hr with an average residence time of 2.1 hr. Polymer product formed was removed periodically so as to maintain an essentially constant weight of polymer in the reactor vessel. The polymer product obtained had a resin density. of 0.919 g/cc a MI (dg/min) of 1.2, a MIR of 29, a bulk density ($lb/ft^3$) of 21.9 and a specific activity (kg PE/g Ti.hr.atm) of 36.

COMPARATIVE EXAMPLE 1

Catalyst Preparation

The catalyst was prepared as in Example 1 with the exception that the chlorination step was postponed until after the $TiCl_4$ addition/reaction.

Polymerization

The polymerization was performed as in Example 1, with the exception that the catalyst feed rate was 13.0 g/hr, the cocatalyst feed rate was 290 cc/hr, the $H_2/C_2H_4$ ratio was 0.07, the $C_4H_8/C_2H_4$ ratio was 0.36, the residence time was 2.7 hr., polymer production rate was 194 lb/hr. The polymer product obtained had a resin density of 0.917, a MI of 0.86, a MIR of 33, and a bulk density of 14.8 $lb/ft^3$. This example demonstrates that prechlorination as in Example 1, results in higher polymer product bulk density as compared with post-chlorination.

EXAMPLE 2

Catalyst Preparation 2 g of the dehydrated silica (D-948) were slurried in 30 cc of hexane under a nitrogen atmosphere in a 50 ml vial. A mixture of nitrogen and chlorine gas (mole ratio 2.5/1) was passed through the slurry for 30 min while maintaining the temperature of the vial at 35° C. The flow rate was such as to present 0.1 g chlorine per minute. The vial was purged of chlorine by means of a nitrogen flow. To the vial was added 4.54 ml of butylethylmagnesium solution in hexane (0.59 mmole mg per ml solution). The slurry was allowed to react for 30 minutes at 35° C. under constant stirring. To the vial was then added 1.2 ml of a $TiCl_4$ solution in hexane (0.5 mmole per ml) and the reaction was maintained for 30 minutes at 35° C. The catalyst was then treated with 0.94 ml of tri-n-hexylaluminum (0.64 mmole/ml solution). The solid material was recovered by decantation, washed 3 times with hexane and dried under nitrogen flow at 35° C.

Polymerization 850 ml of dry, oxygen-free hexane was added to a clean, dry oxygen-free 1.7 l autoclave reactor at room temperature. The reactor was heated to 85° C. and 1.84 ml of 25% (w/w) tri-isobutylaluminum was added to the reactor. 75 mg of the prepared catalyst in the form of a mineral oil slurry was injected into the reactor and 75 mmoles of hydrogen was added to the reactor. 20 ml of butene-1 was pressured into the reactor with sufficient ethylene to bring the total reactor pressure to 150 psig. Polymerization was conducted for forty minutes, at which time the ethylene supply was shut off, the reactor cooled to room temperature and the resin recovered. The specific activity was 409 KgPE/gTi.h.-(mole/lt) and the bulk densiy of the polymer product was 21.2 lbs. per cubic ft.

COMPARATIVE EXAMPLE 2

The catalyst was prepared in the same manner as Example 2, with the exception that the chlorination step was performed after the TiCl$_4$ addition. The polymerization was performed as in Example 2. The specific activiyy was 450 and the recovered polymer product had a bulk densiy of 18.7 lbs per cubic ft. The bulk density of polymer product is lower than that obtained in Example 2.

What is claimed is:

1. A process for the polymerization of ethylene; alpha-olefins having from 3 to 20 carbon atoms; or mixtures of ethylene with other alpha-olefins or diolefins comprising polymerizing in the presence of a catalyst system comprising
   (a) an organoaluminum compound of the formula AlR'''$_n$X'''$_{3-n}$ wherein R''' is hydrogen or hydrocarbyl, X''' is halogen, and n is a number from 1 to 3; and
   (b) a transition metal-containing catalyst component comprising the solid reaction product obtained by treating an inert solid support material in an inert solvent sequentially with
   (A) Cl$_2$, Br$_2$ or an interhalogen,
   (B) an organometallic compound of a Group IIa, IIB or IIIa metal wherein all the metal valences are satisfied with a hydrocarbyl group,
   (C) an oxygen-containing compound selected from ketones, aldehydes, alcohols, siloxanes, or mixtures thereof,
   (D) at least one transisiton metal compound of a Group IVb, Vb, VIb, or VIII metal, and
   (E) pre-reducing the transistion metal-containing component with an organometallic compound of a Group IIa, IIb or IIIa metal, with the proviso that the inert support is first contacted with (A), and the (B) and (C) ingredients can be added to the inert solid
   (i) simultaneously,
   (ii) as the reaction product of (B) and (C), or
   (iii) treatment of the inert solid with (C) immediately precedes treatment with (B).

2. The process as in claim 1 wherein the (B) organometallic compound is a dihydrocarbon magnesium compound represented by R$^1$MgR$^2$, wherein R$^1$ and R$^2$, which can be the same or different, are selected from C$_1$ to C$_{20}$ alkyl groups, aryl groups, cycloalkyl groups, aralkyl groups, alkadienyl groups or alkenyl groups, the oxygen-containing compounds are selected from alcohols and ketones represented by the formula R$^3$OH and R$^4$COR$^5$ wherein R$^3$ and each of R$^4$ and R$^5$ which may be the same or different can be a C$_1$ to C$_{20}$ alkyl group, aryl group, cycloalkyl group, aralkyl group, alkadienyl group or alkenyl group, the (A) halogen is Cl$_2$ and the (E) organometallic compound is an alkylaluminum represented R$_n^7$AlX'$_{3-n}$ wherein X' is a halogen or hydride and R$^7$ is a hydrocarbyl group selected from C$_1$ to C$_{18}$ saturated hydrocarbon and $1 \leq n \leq 3$.

3. The process as in claim 2 wherein the inert solid support material is one of silica, alumina, magnesia or mixtures thereof.

4. The process as in claim 2 wherein R$^1$, R$^2$, R$^3$, R$^4$, R$^5$, and R$^7$ are alkyl or aryl groups having from 1 to 10 carbon atoms.

5. The process as in claim 2 wherein R$^1$ and R$^2$ are different.

6. The process as in claim 5 wherein R$^1$, R$^2$ and R$^3$ are alkyl groups having from 1 to 6 carbon atoms.

7. The process as in claim 6 wherein R$^1$ is butyl.

8. The process as in claim 7 wherein R$^2$ is ethyl.

9. The process as in claim 8 wherein the oxygen-containing component is an alcohol.

10. The process as in claim 9 wherein R$^3$ is butyl.

11. The process as in claim 2 wherein n is 3 and R$^7$ is an alkyl group containing from 1 to 8 carbon atoms.

12. The process as in claim 2 wherein the transition metal compound or mixtures thereof is represented by the formula TrX''$_{4-q}$(OR$^8$)$_q$, TrX''$_{4-q}$R$_q^9$, VOX''$_3$ or VO(OR$^8$)$_3$ wherein Tr is a transition metal, R$^8$ is a hydrocarbyl group having from 1 to 20 carbon atoms, R$^9$ is an alkyl group, aryl group or aralkyl group having from 1 to 20 carbon atoms or a 1,3-cyclopentadienyl, X' is halogen and q is 0 or a number equal to or less than 4.

13. The process as in claim 12 wherein Tr is titanium, vanadium or zirconium.

14. The process as in claim 13 wherein the transition metal compound is TiCl$_4$.

15. The process as in claim 2 wherein the organomagnesium compound and the oxygen-containing compound are reacted together prior to contact with the inert support matarial.

16. The process as in claim 15 wherein the oxygen-containing compound is an alkyl alcohol having from 1 to 4 carbon atoms and the magnesium containing compound is ethyl-n-butylmagnesium.

17. The process as in claim 2 wherein the aluminum compound is a trialkylaluminum wherein the alkyl group has from 1 to 10 carbon atoms.

18. The process as in claim 17 wherein the alkylauminum is tri-n-hexylaluminum.

19. The process of claim 2 wherein the inert solid support material is treated sequentially with ingredient (A), the reaction product of (B) and (C), (D), and (E).

20. The process of claim 19 wherein the inert support is silica, the (A) ingredient is Cl$_2$, the (B)-(C) reaction product is produced by reacting butylethylmagnesium with butanol, (D) is TiCl$_4$ and (E) is tri-n-hexylaluminum.

21. The process of claim 1 comprising polymerizing ethylene and an alpha-olefin comonomer.

* * * * *